(12) United States Patent
Hawkins et al.

(10) Patent No.: US 7,286,917 B2
(45) Date of Patent: Oct. 23, 2007

(54) METHOD OF DETECTING VEHICLE SPEED SENSOR FAILURE

(75) Inventors: Jeffery Scott Hawkins, Farmington Hills, MI (US); Hugh Joseph Cairns, Warren, MI (US)

(73) Assignee: Detroit Diesel Corporation, Detroit, MI (US)

( * ) Notice: Subject to any disclaimer, the term of this patent is extended or adjusted under 35 U.S.C. 154(b) by 322 days.

(21) Appl. No.: 11/121,829

(22) Filed: May 4, 2005

(65) Prior Publication Data

US 2006/0253236 A1    Nov. 9, 2006

(51) Int. Cl.
*G01M 17/00* (2006.01)

(52) U.S. Cl. .......................... 701/34; 340/438

(58) Field of Classification Search ...................... None
See application file for complete search history.

(56) References Cited

U.S. PATENT DOCUMENTS

| | | | |
|---|---|---|---|
| 4,493,303 A | 1/1985 | Thompson et al. | |
| 4,759,212 A * | 7/1988 | Sawada et al. | 73/118.1 |
| 4,866,616 A | 9/1989 | Takeuchi et al. | |
| 4,876,527 A | 10/1989 | Oka et al. | |
| 4,905,544 A | 3/1990 | Ganoung | |
| 4,905,785 A | 3/1990 | Kieffer et al. | |
| 5,303,163 A | 4/1994 | Ebaugh et al. | |
| 5,343,780 A | 9/1994 | McDaniel et al. | |
| 5,371,487 A | 12/1994 | Hoffman et al. | |
| 5,430,432 A | 7/1995 | Camhi et al. | |
| 5,445,128 A | 8/1995 | Letang et al. | |
| 5,461,569 A | 10/1995 | Hara et al. | |
| 5,463,373 A | 10/1995 | Widl et al. | |
| 5,477,827 A | 12/1995 | Weisman, II et al. | |
| 5,586,130 A | 12/1996 | Doyle | |
| 5,706,199 A | 1/1998 | Wilson et al. | |
| 5,896,083 A | 4/1999 | Weisman, II et al. | |
| 6,480,771 B2 * | 11/2002 | Nishida et al. | 701/34 |
| 6,573,827 B1 | 6/2003 | McKenzie | |
| 6,598,698 B2 * | 7/2003 | Murata et al. | 180/443 |
| 6,601,015 B1 | 7/2003 | Milvert et al. | |
| 6,678,606 B2 | 1/2004 | Akins et al. | |
| 6,834,221 B2 | 12/2004 | Jäger et al. | |
| 2006/0095176 A1 * | 5/2006 | Kim | 701/34 |

FOREIGN PATENT DOCUMENTS

JP        2002-331954    * 11/2002

* cited by examiner

*Primary Examiner*—Michael J. Zanelli
(74) *Attorney, Agent, or Firm*—Brooks Kushman P.C.

(57) ABSTRACT

A method of detecting vehicle speed sensor failures is disclosed. The method is intended to prevent or discourage tampering with a vehicle's speed limiting system. The method includes the steps of determining whether the transmission is in neutral or whether the transmission is in its converter mode to prevent false indications of speed sensor failure under certain circumstances.

16 Claims, 1 Drawing Sheet

METHOD OF DETECTING VEHICLE SPEED SENSOR FAILURE

BACKGROUND OF THE INVENTION

1. Field of the Invention

The present invention relates to vehicle speed sensor failure detection diagnostics.

2. Background Art

In the heavy duty vehicle industry there is widespread interest in limiting vehicle speed to improve fuel efficiency. In particular, trucking fleets can reduce costs and encourage safe vehicle operation by limiting the maximum allowable speed of a vehicle. Vehicle operators generally oppose and resist use of vehicle speed limiting systems because they tend to increase the time required to transport shipments that may marginally reduce their efficiency and productivity. Some operators have been known to attempt to frustrate the vehicle speed limiting devices and systems by damaging, disconnecting or modifying such devices and systems.

Governors were originally proposed for speed limiting that were integrated with vehicle fuel systems to limit the quantity of fuel supplied to a vehicle engine. These systems were easy to remove or re-calibrate rendering them ineffective.

With the introduction of electronically controlled engines more sophisticated approaches to vehicle speed limiting have been developed. Algorithms have been proposed for such control systems that provide effective vehicle speed limiting without limiting the engine speed so that the full engine power is available in low gear ranges. These sophisticated systems require multiple inputs that make it substantially more difficult to disable or override vehicle speed limiting systems.

One approach to vehicle speed limiting systems is proposed in U.S. Pat. No. 5,896,083 to Weisman that is assigned to the assignee of the present application. The Weisman speed limiting system monitors the vehicle speed, engine speed and transmission and gear selection to provide a vehicle speed limiting system that may be easily implemented in electronically controlled engines. One problem with this proposed solution is that the system is subject to false indication of system inoperability or tampering at low vehicle speeds.

Another approach to vehicle speed limiting is proposed in U.S. Pat. No. 6,573,827 to McKenzie that is also assigned to applicant's assignee. This patent proposes the use of a global positioning system (GPS) to monitor vehicle speeds. A first GPS signal indicating vehicle location is checked and then compared to a second GPS signal at a subsequent predetermined time period. If the time required to travel from the first GPS location to the second GPS location indicates that the vehicle is proceeding at a greater rate of speed then the maximum allowable speed, the engine control can be used to limit the engine speed to prevent the vehicle from traveling at a speed that is greater than the maximum allowable speed. This is a complicated system that requires the use of global positioning signals that communicate with the GPS of the vehicle. It may also be subject to false indications of tampering or the like if the GPS signal is subject to signal interference.

Inaccurate vehicle speed fault logging can also occur as a result of some vehicle service procedures. When a fault is logged by an engine control system the source of the fault must be determined that requires additional service opera tions. For example, in some instances a stall test may be performed in which the engine is checked to determine if the engine is producing rated power output. In the stall test the engine is run with the transmission in its converter mode to determine if a speed range target may be attained within a set time period. When a stall test is run on a vehicle a false vehicle speed fault code may be logged in the engine control system.

Another service operation that may result in false vehicle speed fault code logging is an engine air restriction test. Air restriction tests may be used to verify proper engine operation upon completion of a service procedure. After replacing an air filter, the service facility may conduct the restriction test by placing the transmission in neutral while the engine is operated through a specified engine speed level. According to the air restriction test procedure, the engine is run at the specified speed to activate an engine diagnostic parameter that may eliminate the need to conduct a road test to verify that the service operation has been successful. Previously, erroneous vehicle speed default codes were logged for the vehicle speed limiting system when conducting restriction tests.

False vehicle speed limiting system errors may also be generated when a vehicle is operated in the converter mode (when the torque converter is not locked up). This may occur when a vehicle is operating in off road conditions in which sand, snow, ice, or mud may result in the wheels slipping that in turn causes the transmission to be shifted into its converter mode. When in the converter mode the engine speed and fueling rate may be sufficient to trigger an erroneous fault log if the vehicle speed is below a predetermined level.

These and other problems are addressed by applicant's invention as summarized below.

SUMMARY OF THE INVENTION

According to one aspect of the present invention a method for detecting vehicle speed sensor failure is disclosed. The method includes several steps that may be performed in one of several sequences. One step is to determine whether a vehicle speed is below a maximum threshold speed value. Another step is determining whether a fueling rate output is above a minimum threshold fueling value. The engine speed may be compared to a minimum threshold engine speed, or RPM, value. The method also may include a step of determining whether the vehicle transmission is in neutral. If the transmission is not in neutral, the system may log a fault code that limits the speed.

Alternatively, instead of determining whether the vehicle transmission is in neutral the method may include the step of determining whether the transmission torque converter is in its converter mode. It is also anticipated that the method may include both steps of determining whether the vehicle transmission is in neutral and whether the transmission is in its converter mode before logging a fault code.

According to another aspect of the invention, the method is repeated at least twice prior to logging a fault code. This may be accomplished by using a counter that is incremented for each reiteration of the algorithm or may be implemented using a timer that is initially set and then checked during the course of a subsequent iteration of the algorithm to determine if the fault condition has existed a sufficient period of time to log the fault code.

According to another aspect of the invention, the system may provide outputs of logging a fault code, enabling a warning indicator such as a warning light or audible alarm.

Also, the method may include limiting the maximum engine speed, for example, by limiting the engine rpm speed to a level that when the engine is in its highest gear range the vehicle will not exceed the maximum allowable vehicle speed.

These aspects of the present invention and others will be better understood with reference to the attached drawing and following detailed description of the illustrated embodiment of the invention.

DETAILED DESCRIPTION OF THE PREFERRED EMBODIMENT(S)

Figure 1:
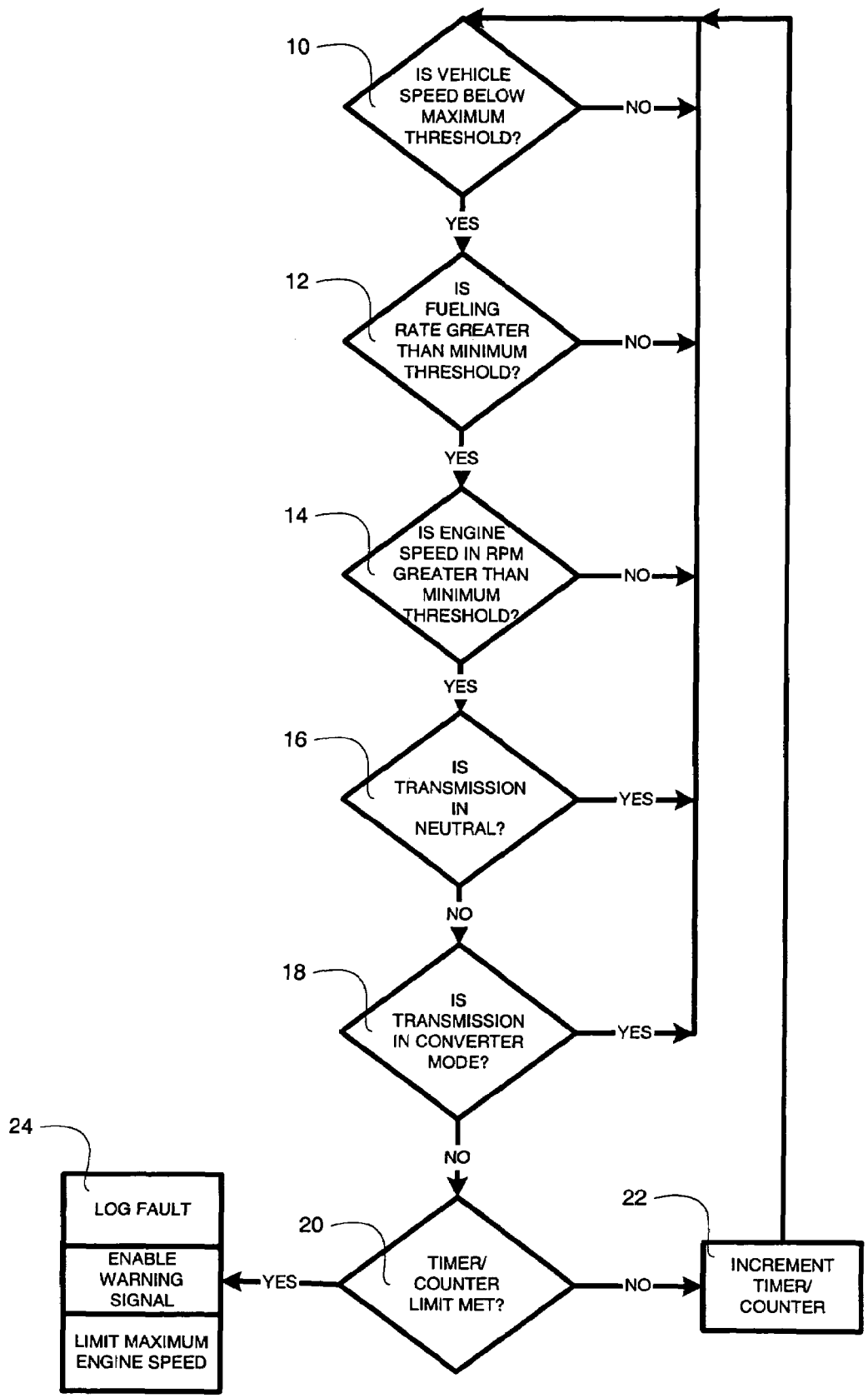
FIG. 1 is a flow chart of one embodiment of the method of detecting a vehicle speed sensor failure in accordance with one embodiment of the invention.

According to FIG. 1, a flow chart illustrating one algorithm for a method of detecting vehicle speed sensor failure is illustrated. It should be understood that the order of the steps, omission of some steps and additional steps may be added to the algorithm.

In the illustrated embodiment, the algorithm begins at 10 by determining if the vehicle speed is below a maximum threshold. If not, the algorithm is reinitiated. If the speed is below a maximum threshold at 10 the algorithm proceeds to determine at 12 if the fueling rate is greater than a minimum threshold. If not, the algorithm is reinitiated. If so, the algorithm proceeds at 14 to determine if the engine speed (RPM) is greater than the minimum threshold. If not, the algorithm is reinitiated. If so, the algorithm continues at 16 by determining if the transmission is in neutral. If so, the algorithm is reinitiated. If not, the algorithm tests to determine if the transmitter is in a converter mode. If the transmission is in a converter mode, the algorithm is reinitiated. If it is not in a converter mode, such as when the transmission is locked up, the algorithm continues to determine whether the timer/counter limit has been met. If the timer/counter limit has not been met indicating that the condition has not existed for a sufficient period of time to warrant corrective action, the algorithm increments the timer/counter and reinitiates the algorithm. If the timer/counter limit has been met at 20 the algorithm is directed to provide an appropriate output at 24.

The system may perform at 24 one or more of the following tasks: log a fault; enable a warning signal; or, limit the maximum engine speed. When a fault is logged, the electronic control system records in the system memory details relating to the fault as noted by the algorithm. If the warning signal is enabled, a check engine light or warning buzzer or other alarm may be actuated to warn a driver of the vehicle speed sensor fault indication. The system may limit the maximum engine speed by preventing the engine from operating in excess of the engine speed required to move the vehicle at the maximum allowable vehicle speed at the highest available transmission gear ratio.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting vehicle speed sensor failure, comprising:
    determining whether a vehicle speed value is below a maximum threshold speed value;
    determining whether a fueling rate value is above a minimum threshold fueling value;
    determining whether an engine speed value is above a minimum threshold rpm value;
    determining whether the vehicle transmission is in neutral;
    determining that the vehicle speed sensor has failed when the vehicle speed value is below the maximum threshold speed value, the fueling rate value is above the minimum threshold fueling value, the engine speed is above a minimum threshold rpm value, and that the transmission is not in neutral; and
    logging a fault code based upon the determination that the vehicle speed sensor has failed.

2. The method of claim 1 further comprising verifying the status of each determining step at least twice prior to logging the fault code.

3. The method of claim 2 wherein the step of verifying the determining steps includes incrementing a counter the first time that all of the determining step conditions are met and then repeating each determining step in sequence and incrementing the counter until a predetermined number of increments have been completed.

4. The method of claim 2 wherein the step of verifying the determining steps includes incrementing a timer the first time that all of the determining step conditions are met and then repeating each determining step in sequence and incrementing the timer until a predetermined number of increments have been completed.

5. The method of claim 1 further comprising the step of determining whether the transmission is in its converter mode prior to the step of logging the fault code.

6. The method of claim 1 wherein the step of logging a fault code further comprises enabling a warning indicator.

7. The method of claim 1 wherein the step of logging a fault code further comprises limiting the maximum engine speed.

8. A method for detecting failure of a vehicle speed sensor, comprising:
    determining whether a vehicle speed value is below a maximum threshold speed value;
    determining whether a fueling rate value is above a minimum threshold fueling value;
    determining whether an engine speed value is above a minimum threshold value;
    determining whether the vehicle transmission is in a converter mode;
    determining that the vehicle speed sensor has failed when the vehicle speed value is below a maximum threshold speed value, the fueling rate value is above a minimum threshold fueling value, the engine speed value is above a minimum threshold value, and the transmission is not in the converter mode; and
    logging a fault code based upon the determination that the speed sensor has failed and further comprises enabling a warning signal.

9. The method of claim 8 wherein the step of logging a fault further comprises limiting the maximum engine speed.

10. A method for detecting failure of a vehicle speed sensor, comprising:
    determining whether a vehicle speed value is below a maximum threshold speed value;

determining whether an engine speed value is above a minimum threshold value;

determining whether the vehicle transmission is in neutral;

determining whether the vehicle transmission is in a converter mode;

determining that the vehicle speed sensor is in a failure mode based upon the vehicle speed value being below the maximum threshold speed value, the engine speed value being above a minimum threshold value, the transmission being not in neutral, and the transmission not being in the converter mode; and logging a fault code in an engine controller based upon the determination that the speed sensor is in the failure mode.

11. The method of claim 10 wherein the step of logging a fault code also includes limiting the maximum engine speed.

12. The method of claim 10 further comprising determining whether a fueling value is above a minimum threshold fueling value.

13. The method of claim 10 further comprising verifying that the conditions determined in each of the determining steps are present for a minimum threshold period of time.

14. The method of claim 13 wherein the step of verifying the determining steps includes incrementing a counter the first time that all of the determining step conditions are met and then repeating each determining step in sequence and incrementing the counter until a predetermined number of increments have been completed.

15. The method of claim 13 wherein the step of verifying the determining steps includes incrementing a timer the first time that all of the determining step conditions are met and then repeating each determining step in sequence and incrementing the timer until a predetermined number of increments have been completed.

16. The method of claim 10 wherein the step of logging a fault code further comprises enabling a warning indicator.

* * * * *